United States Patent [19]

Parnell

[11] Patent Number: 5,743,359

[45] Date of Patent: Apr. 28, 1998

[54] BOLT LUBING TOOL

[75] Inventor: Timothy L. Parnell, Raleigh, N.C.

[73] Assignee: General Electric Company, Cincinnati, Ohio

[21] Appl. No.: 754,344

[22] Filed: Nov. 22, 1996

[51] Int. Cl.$^6$ ........................................ F16N 7/12
[52] U.S. Cl. .................. 184/102; 184/64; 184/88.1; 118/268
[58] Field of Search .................. 184/64, 102, 88.1; 118/264, 268, 270; 15/220.4

[56] References Cited

U.S. PATENT DOCUMENTS

| D. 324,137 | 2/1992 | Mendez . | |
|---|---|---|---|
| 2,145,168 | 1/1939 | Flagg . | |
| 2,441,642 | 5/1948 | McDaniel | 184/102 |
| 2,663,213 | 12/1953 | Davidson et al. . | |
| 4,063,617 | 12/1977 | Shenk | 184/102 |
| 4,245,367 | 1/1981 | Stoute | 15/220.4 |
| 4,932,801 | 6/1990 | Osborne . | |
| 5,222,821 | 6/1993 | Osborne et al. . | |
| 5,273,384 | 12/1993 | Dunbar . | |
| 5,293,960 | 3/1994 | Majerowicz et al. . | |
| 5,407,026 | 4/1995 | Vald'via | 118/264 |
| 5,445,243 | 8/1995 | Coffey et al. . | |
| 5,564,527 | 10/1996 | Coffey et al. | 184/102 |

FOREIGN PATENT DOCUMENTS

| 885673 | 7/1949 | Germany | 118/264 |
|---|---|---|---|
| 93/07452 | 4/1993 | WIPO | 15/220.4 |

*Primary Examiner*—Thomas E. Denion
*Attorney, Agent, or Firm*—Andrew C. Hess; Nathan D. Herkamp

[57] ABSTRACT

A lubricating tool includes a longitudinally extending casing, a resilient absorbent medium disposed within the casing, and longitudinally extending slits radially extending from a longitudinally extending centerline essentially in a center of the absorbent medium. A longitudinally extending pilot hole extends along the centerline and the slits radially extend away from the pilot hole. A lubricant supply passage extends from a lubricant supply aperture in the casing through the absorbent medium to the pilot hole and, preferably, the aperture is internally threaded to accept a tube leading to a pressurized supply of lubricant such as grease.

14 Claims, 3 Drawing Sheets

BOLT LUBING TOOL

BACKGROUND OF THE INVENTION

1. Field of the Invention

The present invention relates to lubing devices and, more particularly, to a lubing tool for applying grease to threaded bolts.

2. Discussion of the Background Art

Many devices have been developed to lube articles using grease guns that are either hand or hydraulically powered. For many applications, threads of bolts must be lubricated prior to installation. A common method to lube the threads is to use a brush or some soft material to apply the grease directly to the threads. Needless to say, this is a very dirty, messy, time consuming task. Poly-foam brushes, as well as bristle brushes, have been used to apply the grease to the threads.

A consistent coating of grease over each thread and from bolt to bolt is very desirable. A more uniform coating of grease results in more accurate bolt torquing which results in a more well distributed bolting forces. The more uniform coating of grease also provides a cleaner working environment and work assembly.

It is, therefore, very desirable to have an apparatus to simply, easily and cleanly apply a thin even and consistent coating of grease to the threads of a bolt. To this end, the present invention was made.

SUMMARY OF THE INVENTION

A lubricating tool includes a longitudinally extending casing, a resilient absorbent means disposed within the casing, and longitudinally extending slits radially extending from a longitudinally extending centerline essentially in a center of the absorbent means. The tool preferably further includes a longitudinally extending pilot hole in the absorbent means, the pilot hole extends along the centerline to a longitudinally distal end of the absorbent means, and the slits radially extends away from the pilot hole. A more particular embodiment of the invention further provides a lubricant supply passage extending from a lubricant supply aperture in the casing through the absorbent means to the pilot hole and, preferably, the aperture is internally threaded. The tool preferably further includes a retention means to retain the absorbent means inside of the casing where the retention means may be tabs at each of two longitudinally spaced apart open ends of the casing where the tabs are bent over and/or engage the absorbent means. The absorbent is preferably made from a poly-foam material.

Preferably, the casing is annular and the resilient absorbent means is cylindrical. The tool may further include securing means to secure the absorbent means inside of the casing during bolt lubricating process where the securing means may include internal threading of the annular casing. A lubricant supply passage preferably extends from a lubricant supply aperture in the casing through the absorbent means to the pilot hole.

ADVANTAGES OF THE INVENTION

Among the advantages provided by the present invention is that it provides an inexpensive bolt lubricating device that is simple and inexpensive to construct and use in a shop environment. The present invention has the advantage over prior art techniques of providing a more consistent coating of grease over each thread and from bolt to bolt. The invention also provides a more uniform coating of grease which results in more accurate bolt torquing which further results in a more well distributed bolting forces. The more uniform coating of grease also provides a cleaner working environment and work assembly.

Another advantage of the present invention is that it provides for simply, easily, and cleanly applying a thin, even, and consistent coating of grease to the threads of a bolt.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
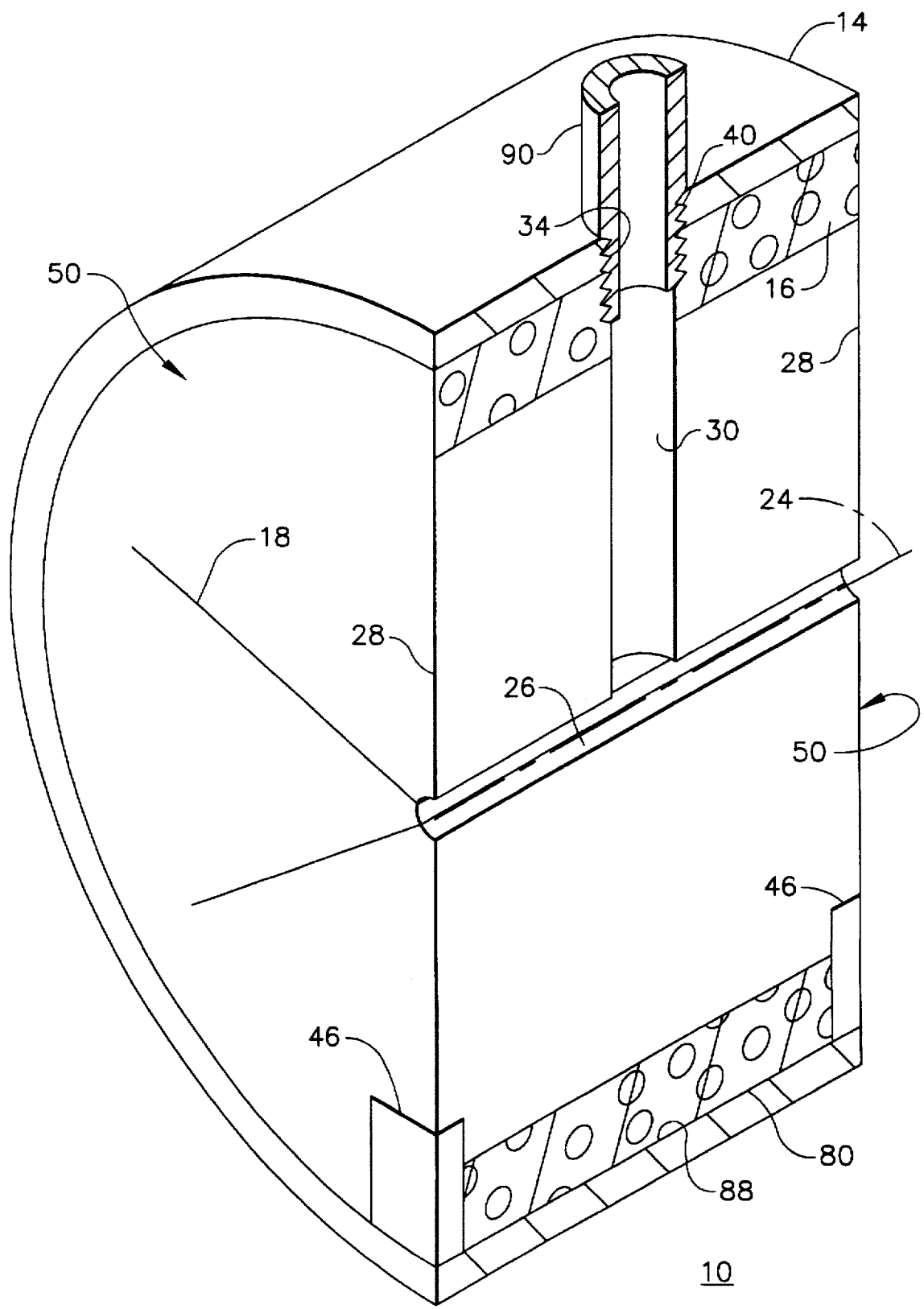
FIG. 1 is a partial cutaway perspective view illustrating a lubricating tool in accordance with an exemplary embodiment of the present invention.
Figure 2:
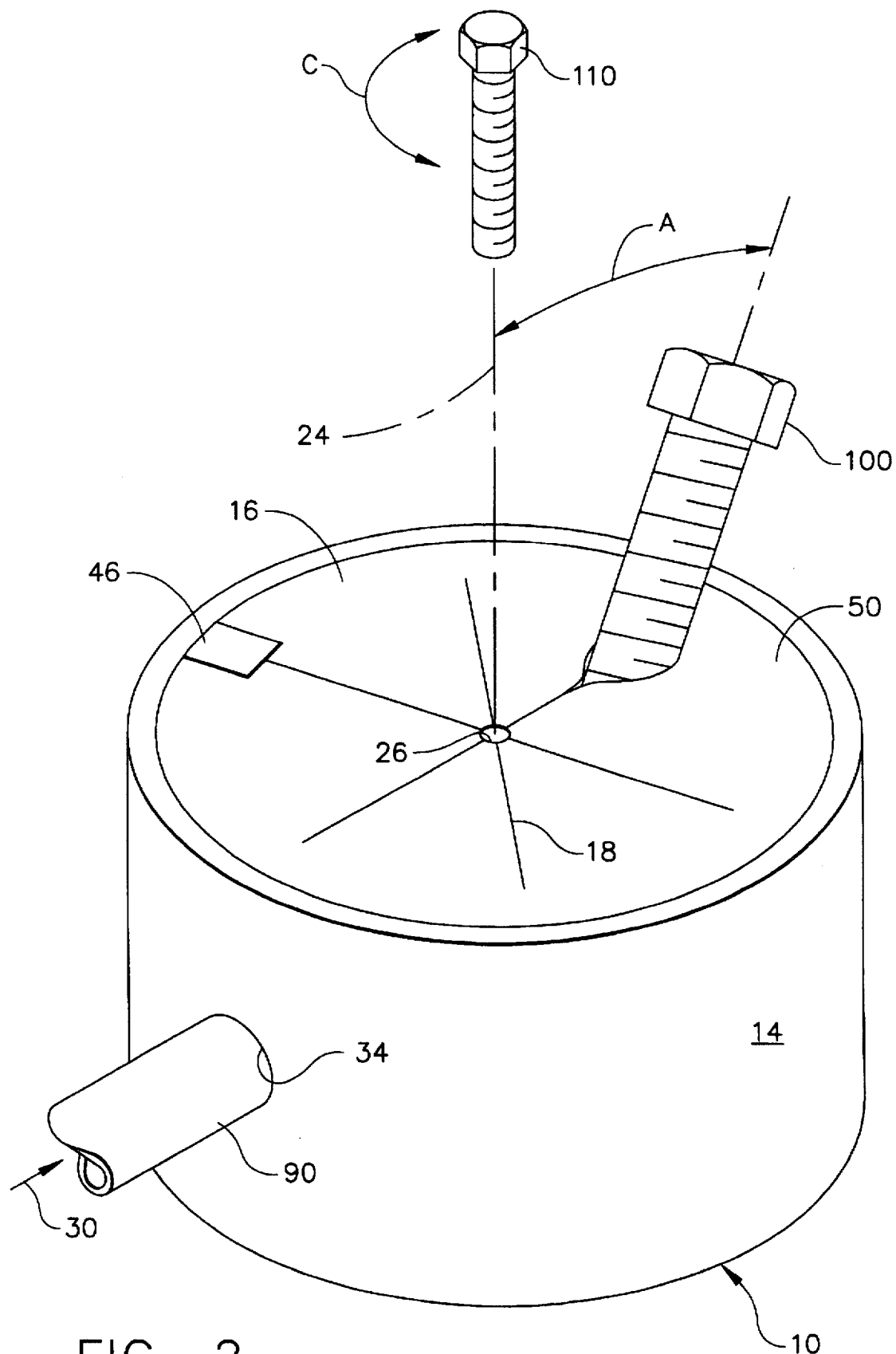
FIG. 2 is a perspective view of the tool in FIG. 1 illustrating use of the tool for two differently sized bolts.

Referring now to the drawings in detail wherein identical numerals indicate the same elements throughout the figures. FIGS. 1 and 2 illustrate a lubricating tool 10 having a longitudinally extending casing 14, a resilient absorbent means in the form of a lubricant absorbant medium 16 (preferably made of a poly-foam material) disposed within the casing, and longitudinally extending slits 18 radially extending from a medium centerline 24 essentially in a center of the medium 16. The absorbant medium 16 preferably has a longitudinally extending pilot hole 26 preferably coextensive with and centered about the medium centerline 24. The pilot hole 26 preferably extends along the medium centerline 24 to a longitudinally distal end 28 of the absorbent means, and the slits 18 radially extends away from the pilot hole. A lubricant supply passage 30 extends from a lubricant supply aperture 34 in the casing 14 through the absorbent medium 16 to the pilot hole 26 and, preferably, the aperture is internally threaded 40.

The tool 10 preferably further includes a retention means 44 to retain the absorbent medium 16 inside of the casing 14 where the retention means may be tabs 46 extending from the casing and bent over at the medium at either one of or both of two longitudinally spaced apart open ends 50 of the casing. The tabs 46 may be bent over and/or positioned to engage the absorbent medium 16. The absorbent medium is preferably made from a poly-foam material like polyurethene which is well known in the art for use as a lubricant absorbent.

Preferably, the casing 14 is annular and the resilient absorbent medium 16 is cylindrical. The tool 10 may further include securing means 84 to secure the absorbent medium 16 inside of the casing during a bolt lubricating process where the securing means may include internal threading 88 of the annular casing.

Figure 3:
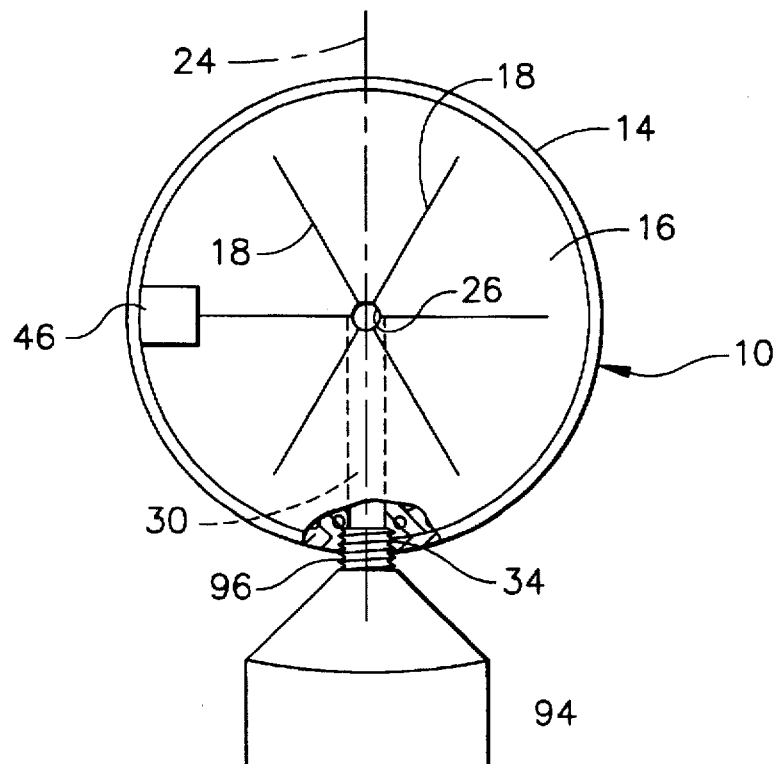
FIG. 3 is a partial cutaway top view of the tool in FIG. 1 illustrating use of the tool with a tube of grease.
Figure 4:
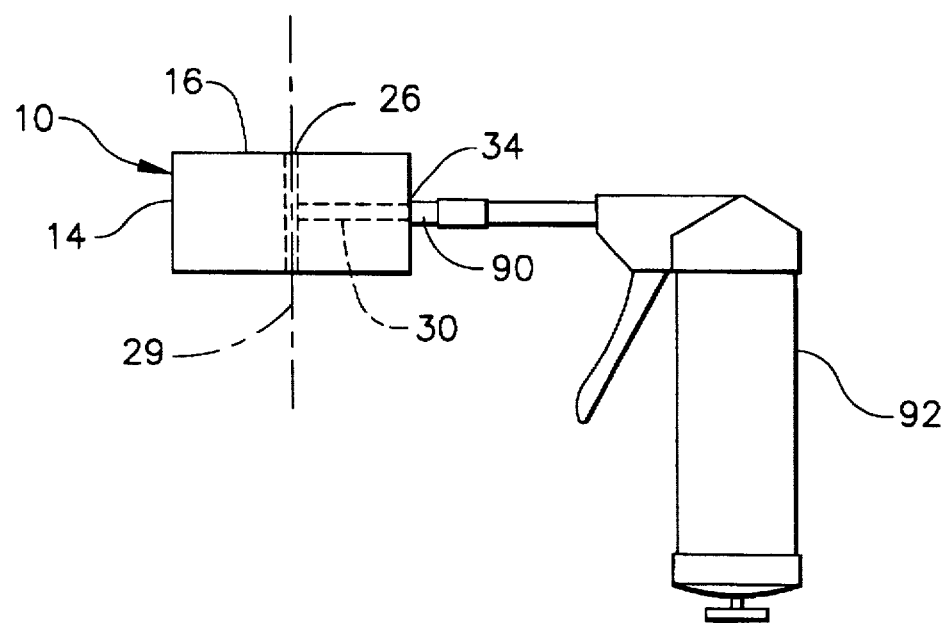
FIG. 4 is a partial cutaway top view of the tool in FIG. 1 illustrating use of the tool with a grease gun.

The absorbent medium 16 is charged with lubricant through the lubricant supply aperture 34 in the casing 14 lubricant and the supply passage 30. A partially exterior threaded pipe 90 may be screwed into the interior threaded lubricant supply aperture 34 to serve as an adapter or coupler and sized to accept a hand operated pressurized grease gun 92 as shown in FIG. 4 or some other sort of pressurized grease supply. Alternatively, a tube 94 of grease, as shown in FIG. 3, having an exterior threaded nozzle 96 may be directly screwed into the lubricant supply aperture 34. Another variant is to have pipe 90 be an adapter between the lubricant supply aperture 34 and an externally or internally threaded supply tube 94 or nozzle 96 of a grease gun, a tube of lubricant, or some other sort of pressurized grease supply apparatus as illustrated in FIG. 4.

The tool 10 can be used to lubricate various size bolts such as a larger diameter bolt 100 and a smaller diameter bolt 110 as illustrated in FIG. 2. The larger diameter bolt 100 may be placed into one of the slits 18 at an angle A to the pilot hole 26 and twisted or turned in a circumferential direction C. The smaller diameter bolt 110 can be placed into the pilot hole 26 and twisted or turned in another circumferential direction. This illustrates the versatility of the tool 10 in its ability to accommodate bolts of varying sizes.

While the preferred embodiment of our invention has been described fully in order to explain its principles, it is understood that various modifications or alterations may be made to the preferred embodiment without departing from the scope of the invention as set forth in the appended claims.

What is claimed is:

1. A lubricating tool comprising:

a longitudinally extending casing, a resilient absorbent means disposed within said casing, longitudinally extending slits radially extending from a longitudinally extending centerline essentially in a center of said absorbent means, and a lubricant supply passage extending from a lubricant supply aperture in said casing through said absorbent means to said center line.

2. A tool as claimed in claim 1 further comprising:

a longitudinally extending pilot hole in said absorbent means, said pilot hole extending along said centerline to a longitudinally distal end of said absorbent means, and said slits radially extending away from said pilot hole.

3. A tool as claimed in claim 2 wherein said aperture is internally threaded.

4. A tool as claimed in claim 3 further comprising a retention means to retain said absorbent means inside of said casing.

5. A tool as claimed in claim 4 wherein said retention means comprises tabs at each of two longitudinally spaced apart open ends of said casing wherein said tabs engage said absorbent means.

6. A tool as claimed in claim 5 wherein said absorbent means comprises a poly-foam material.

7. A tool as claimed in claim 1 wherein said casing is annular and said resilient absorbent means is cylindrical and said tool further comprises securing means to secure said absorbent means inside of said casing during bolt lubricating process.

8. A tool as claimed in claim 7 further comprising said pilot hole extending along said centerline to a longitudinally distal end of said absorbent means.

9. A tool as claimed in claim 8 wherein said aperture is internally threaded.

10. A tool as claimed in claim 9 further comprising a retention means to reatain said absorbent means inside of said casing.

11. A tool as claimed in claim 10 wherein said retention means comprises tabs at each of two longitudinally spaced apart open ends of said casing wherein said tabs engage said absorbent means.

12. A tool as claimed in claim 11 wherein said casing is internally threaded.

13. A tool as claimed in claim 12 wherein said absorbent means comprises a poly-foam material.

14. A lubricating tool comprising:

a longitudinally extending casing, a resilient absorbent means disposed within said casing, longitudinally extending slits radially extending from a longitudinally extending centerline essentially in a center of said absorbent means, said resilient absorbent means is charged with a lubricant, a longitudinally extending pilot hole in said absorbent means, said pilot hole extending along said centerline to a longitudinally distal end of said absorbent means, and said slits radially extending away from said pilot hole.

\* \* \* \* \*